US012015904B2

(12) United States Patent
Ostrup et al.

(10) Patent No.: US 12,015,904 B2
(45) **Date of Patent: *Jun. 18, 2024**

(54) TARGETED SOUND PROJECTION DEVICE

(71) Applicant: Mozo, Inc., San Diego, CA (US)

(72) Inventors: Richard Ostrup, San Diego, CA (US); Matthew Ostrup, San Diego, CA (US)

(73) Assignee: Mozo, Inc., San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/896,542

(22) Filed: Aug. 26, 2022

(65) Prior Publication Data

US 2022/0408189 A1 Dec. 22, 2022

Related U.S. Application Data

(63) Continuation of application No. 17/134,317, filed on Dec. 26, 2020, now Pat. No. 11,477,574.

(60) Provisional application No. 62/954,386, filed on Dec. 27, 2019, provisional application No. 62/704,162, filed on Apr. 24, 2020.

(51) Int. Cl.
*H04R 5/02* (2006.01)
*H04S 7/00* (2006.01)

(52) U.S. Cl.
CPC ............ *H04R 5/023* (2013.01); *H04S 7/303* (2013.01)

(58) Field of Classification Search
CPC ................................ H04R 5/023; H04S 7/303
USPC ........................................................ 381/303
See application file for complete search history.

(56) References Cited

U.S. PATENT DOCUMENTS

| | | | | |
|---|---|---|---|---|
| 9,513,602 | B1 * | 12/2016 | Russell | G10K 15/04 |
| 2005/0281428 | A1 * | 12/2005 | Ventrola | H04R 1/02 381/387 |
| 2006/0109989 | A1 * | 5/2006 | Linhard | H04R 1/345 381/160 |
| 2019/0104362 | A1 * | 4/2019 | Nakagawa | H04R 3/12 |

* cited by examiner

*Primary Examiner* — Paul Kim
(74) *Attorney, Agent, or Firm* — Khanh T. Glatzel; Premium IP Services, P.C.

(57) ABSTRACT

This application discloses a device to project sound to a specific person while keeping the sound away from others nearby. The device has various parametric speakers arranged in a pattern to project sounds in a narrow field while preventing dispersion of sounds to nearby areas. The device can be connected to other electronic equipment by wires or wirelessly, and can be removed and used in different settings. This device has particular application in delivering sounds to infants and toddlers to soothe them while the same sounds are not heard by adults nearby.

18 Claims, 5 Drawing Sheets

TARGETED SOUND PROJECTION DEVICE

CROSS-REFERENCE TO RELATED APPLICATIONS

This application is a continuation of U.S. application Ser. No. 17/134,317, filed on Dec. 26, 2020, which claims the benefit of U.S. Provisional Application No. 62/954,386, filed Dec. 27, 2019 and U.S. Provisional Application No. 62/704,162, filed Apr. 24, 2020. Each of the above-referenced patent applications is incorporated by reference in its entirety.

BACKGROUND OF THE INVENTION

Field of the Invention

This invention is in the field of sound transmission and projection. The invention concerns a device capable of projecting sound in a particular manner, thereby delivering sound to a specific person and not anyone nearby.

Description of the Related Technology

Delivering sounds to a particular person while avoiding other persons nearby is a need addressed by many. For adults driving children in vehicles, there are screens and projectors installed behind the driver to entertain the occupants of the back seat, who often are children. In these instances, sound delivery is necessary for the non-drivers, but the driver preferably does not hear the same sounds.

At the same time, sounds are often used to soothe small children, in particular infants and toddlers. Songs, lullabies, and rhymes are used regularly, giving rise to the term "nursery rhymes". Delivery of such sounds to your children is desirable, and so is the desire to keep such sounds away from others, especially adults, who surround young children.

The need to delivery sounds to a specific person but not to others in the near vicinity is clearly demonstrated by various projects promising sound delivery "like a headphone" but without one. In other words, the goal is sounds being delivered to the recipient but no one else nearby. Technology used include a variety of techniques, including sound frequency modification, small speakers, etc.

Since the early 1960s, researchers have been experimenting with creating directive low-frequency sound from nonlinear interaction of an aimed beam of ultrasound waves produced by a parametric array using heterodyning. Ultrasound has much shorter wavelengths than audible sound, so that it propagates in a much narrower beam than any normal loudspeaker system using audio frequencies. Most of the work was performed in liquids (for underwater sound use). A transducer can be made to project a narrow beam of modulated ultrasound that is powerful enough, at 100 to 110 dBSPL, to substantially change the speed of sound in the air that it passes through. The air within the beam behaves nonlinearly and extracts the modulation signal from the ultrasound, resulting in sound that can be heard only along the path of the beam, or that appears to radiate from any surface that the beam strikes. This technology allows a beam of sound to be projected over a long distance to be heard only in a small well-defined area; for a listener outside the beam the sound pressure decreases substantially. This effect cannot be achieved with conventional loudspeakers, because sound at audible frequencies cannot be focused into such a narrow beam.

The commonly stated range of human hearing is 20 to 20,000 Hz. Under ideal laboratory conditions, humans can hear sound as low as 12 Hz and as high as 28 kHz, though the threshold increases sharply at 15 kHz in adults, corresponding to the last auditory channel of the cochlea. The human auditory system is most sensitive to frequencies between 2,000 and 5,000 Hz. Individual hearing range varies according to the general condition of a human's ears and nervous system. The range shrinks during life, usually beginning at around age of eight with the upper frequency limit being reduced. Women typically experience a lesser degree of hearing loss than men, with a later onset. Men have approximately 5 to 10 dB greater loss in the upper frequencies by age 40.

Children under the age of 8 therefore have sensitivity to higher frequency than adults who care for them. Sounds delivered at higher frequency are more perceptible to children than to adults. To delivery specific sounds to children while avoiding delivering the same sounds to adults nearby, delivering sounds at high frequencies is an option.

Meditation is a practice of controlled breathing and quieting of the mind to bring the brain to a low activity state. In a deep meditation state, the brain generates theta brain wave, which is associated with reduced consciousness but is more active than delta wave, which is associated with sleep. The advantages of meditation are numerous, one of them being the ability to stay in the present and focus on the task at hand, thereby improving functioning and decreasing distraction. For children, meditation plays a role in the same manner as adults, where the practice of mindfulness increases functioning.

There are many different techniques to practice meditation. One of them being listening to comforting sounds, such as sounds of small waves crashing on the beach or sounds of a forest. Delivering such sounds to promote relaxation is a common practice in mental health care. For children, the practice of delivering relaxing sound has the same benefits.

When adults care for children in "passive" settings, where the adults provide an eye on the children but do not directly engage them, keeping the child "entertained" while allowing the adult to function in a different capacity increases the experience quality for both of them. For example, a woman taking a child out for a walk in a stroller would be better served if the child is entertained during the walk without disruption. Similar, an adult driving a car with a child in a child's car seat would be able to focus on driving without worrying about the child if the child is entertained by a different means.

To provide a solution to the above demands, this invention provides a targeted sound projection device, which delivers sounds to a young child while adults nearby would not hear the same sounds. The sounds delivered are entertaining as well as relaxing. This targeted sound projection device delivers sounds to a young child only by delivering sounds in a specific, small size physical location.

ABBREVIATIONS

CD: Compact Disc
dB: Decibel
dBSPL: decibel of Sound Pressure Level
DVD: Digital Versatile Disc
Hz: Hertz
kHz: kilo Hertz

SUMMARY

The present invention provides a sound projection device configured to deliver sounds to a person while not delivering sounds to another person nearby. The sound projection device may be used to deliver sounds to a young child in a car seat, a crib or a baby stroller to soothe the baby and provide meditative effects. The sounds delivered may be guided meditation sounds, ocean wave sounds, light music, lullabies, songs, nursery rhymes, or other suitable sounds.

In particular, the present invention provides a sound projection device, comprising: a hollow body with a thickness, a front and a back, the hollow body configured to contain multiple components;

a plurality of parametric speakers arranged with the hollow body and completely contained within the hollow body;

a wireless communication means configured to communicate with at least one remote computing device and to operatively connect to the plurality of parametric speakers, the wireless communication means is configured to receive signals from the remote computing device and operate the plurality of parametric speakers;

a power source;

multiple wires configured to physically and operatively connect the plurality of parametric speakers to each other, to the wireless communication means, and to the power source;

a front cover attached to the front of the hollow body; and a back cover attached to the back of the hollow body;

wherein the parametric speakers are wired parallelly.

This invention provides a sound projection device as above, wherein the hollow body is in substantially tubular shape.

This invention provides a sound projection device as above, wherein the hollow body is in substantially rectangular shape.

This invention provides a sound projection device as above, further comprising an on/off switch.

This invention provides a sound projection device as above, further comprising a sound directing panel attached to the front cover.

This invention provides a sound projection device as above, wherein the sound directing panel is in the shape of a cone.

This invention provides a sound projection device as above, wherein the sound directing panel is in the shape of a baseball visor attached to the front cover at an angle.

This invention provides a sound projection device as above, wherein the angle is 45°.

This invention provides a sound projection device as above, wherein the back is configured to be attachable to a mounting pad.

This invention provides a sound projection device as above, further comprising a mounting pad configured to be attachable to the back of the body.

This invention provides a sound projection device as above, further comprising a detachable, flexible handle attached to the mounting pad.

This invention provides a sound projection device as above, wherein the detachable, flexible handle is adjustable in length.

This invention provides a sound projection device as above, further comprising a detachable clip attached to the detachable, flexible handle.

This invention provides a sound projection device as above, further comprising a strap attachable to the mounting pad.

This invention provides a sound projection device as above, wherein the strap has a Velcro attachment mechanism on the strap's body.

This invention provides a sound projection device as above, wherein the strap has eyelets to change the length in use.

This invention provides a sound projection device as above, further comprising a volume adjustment button.

This invention provides a sound projection device as above, further comprising a remote computing device configured to operatively connect to the sound projection device via the wireless communication means.

This invention provides a method to provide sounds to a child, the method comprising:

providing a sound projection device as above;

orienting the sound projection device towards the child;

turning on the sound projection device using the on/off switch;

activating the sound projection device using the remote computing device; and playing sounds from the remote computing device.

DETAILED DESCRIPTION OF CERTAIN INVENTIVE EMBODIMENTS

Figure 1:
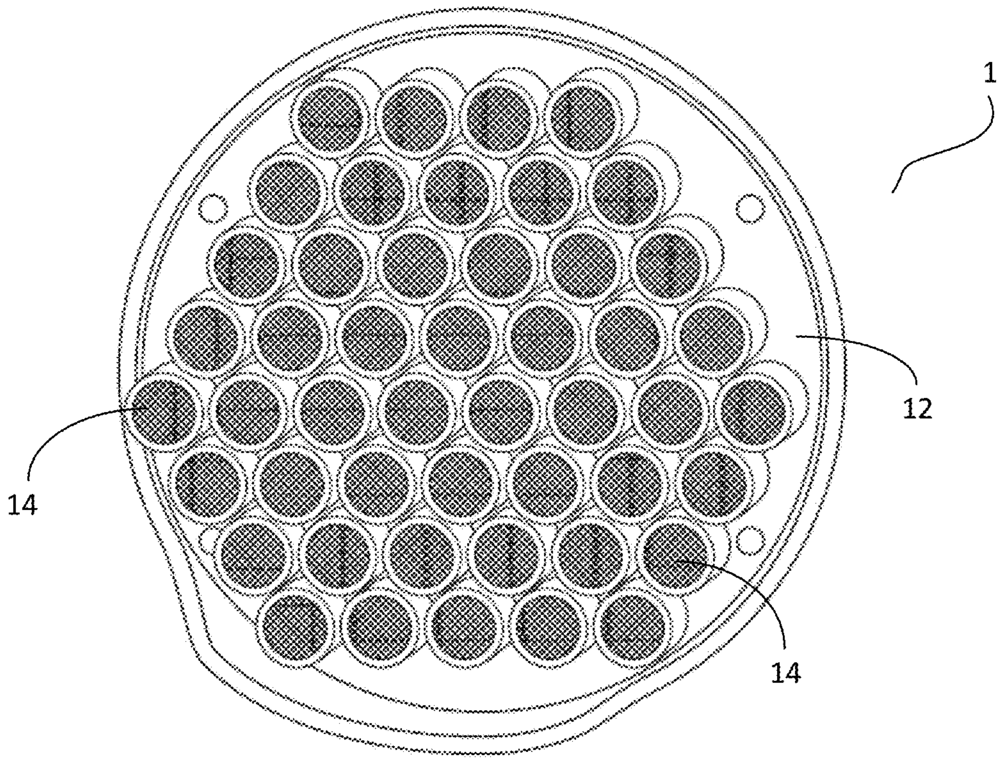
FIG. 1 illustrates a cluster of parametric speakers arranged inside a sound projection device according to embodiments.

This present invention is capable of being embodied in various forms. The description below of several embodiments is made with the understanding that the present disclosure is to be considered as an exemplification of the claimed subject matter and is not intended to limit the attached claims to the specific embodiments illustrated. The headings used throughout this disclosure are provided for convenience only and are not to be construed to limit the claims in any way. Embodiments illustrated under any heading may be combined with embodiments illustrated under any other heading.

As used herein, the verb "to comprise" in this description, claims, and other conjugations are used in its non-limiting sense to mean those items following the word are included, but items not specifically mentioned are not excluded.

Reference to an element by the indefinite article "a" or "an" does not exclude the possibility that more than one of the elements are present, unless the context clearly requires that there is one and only one of the elements. The indefinite article "a" or "an" thus usually means "at least one." Additionally, the words "a" and "an" when used in the present document in concert with the words "comprising" or "containing" denote "one or more".

As used herein in the specification and claims, including as used in the examples and unless otherwise expressly specified, all numbers may be read as if by prefaced by the word "about" or "approximately", even if the term does not expressly appear. The phrase "about" or "approximately" may be used when describing magnitude and/or position to indicate that the value and/or position described is within a reasonably expected range of values and/or positions.

All dimensions given herein are for illustrative purposes only and in no way will limit the inventions by these dimensions. It is to be understood that the invention may be constructed to have different dimensions than those provided herein and is still within the scope of the embodiments described herein. Drawings are not necessarily drawn to scale.

As used herein, like numerals indicate like components even though the components may be used in different manners or at different places. Where there are multiple components of the same nature, a numeral refers to one, some, or all of the components of the same nature, depending on the context.

All dimensions specified in this specification are by way of example only and not intended to be limiting. The actual size of the sound projection device herein may be chosen or modified for intended use, including use on a baby's stroller, a baby's crib, or on the back of a car seat, among different settings.

As used herein, the term "flexible" means the ability to be changed in shape by physical force and then return back to the shape once the physical force is removed or another physical force is used to adjust the shape.

As used herein, the term "sound directing panel" means a thin sheet of material fashioned in a certain geometrical shape, attached to a sound projection device and functions to direct sound using its body.

Embodiments of this application relate to a sound projection device. The device may comprise a plurality of parametric speakers arranged in a certain fashion to project sounds in a certain direction with very narrow dimensional range, such that one person may hear the sound while another person nearby may not hear the same sound. The device achieves this purpose by a combination of two factors: arrangement of the plurality of parametric speakers and directing of sound by a sound directing panel. The sound projection device may be attached to different handles or straps and/or mounted at different locations to project sounds where needed.

FIG. 1 illustrates the arrangement of the plurality of parametric speakers 14 within the sound projection device 1. The plurality of parametric speakers 14 may be arranged within the sound projection device 1 such that the combination of the sound projected from the speakers is within the projection range of the sound. By way of an example, the total number of parametric speakers 14 shown in FIG. 1 is forty-eight (48). The parametric speakers 14 in this embodiment included herein emit sounds up to ninety-two (92) decibels. It is contemplated that sounds higher than nine two (92) decibels may be emitted from the sound projection device with the use of more or higher capacity parametric speakers.

While the sound projection device 1 may be configured to emit more than ninety-two (92) decibels, it may be in the best interest of the child to receive sounds at less than seventy (70) dB in volume. Therefore, the sound projection device 1 may be provided with instructions not to exceed seventy (70) dB when adjusting volume for children's use. However, the sound projection device 1 can deliver louder sound than seventy (70) dB or ninety-two (92) dB and may be adjusted as such when needed.

In this embodiment, the sound can be projected to a person up to twelve (12) feet away. The sound may be projected further away if needed using more parametric speakers in this sound projection device and a higher voltage. The sound can be received clearly by a person position at little as twelve (12) inches away from the sound projection device, making it an ideal way to deliver sounds to young children and toddler sitting or lying in a crib, a stroller, or a child car child seat, or other locations.

The parametric speakers 14 as shown in FIG. 1 are arranged close to each other to provides a cluster of speakers. During operation, the close proximity of the parametric speakers 14 may work to combine the different sound waves into a larger "beam" that is the combination of the small sound beams emitted by each individual parametric speaker. Each of the parametric speaker may not emit enough sound to project the needed volume, but experiments show that a combination of forty-eight (48) speakers as included herein successfully produces up to ninety-two (92) decibels. The volume may be adjusted to fit the need of the user using a volume adjustment mechanism. In embodiments, the volume may be adjusted by either interaction with a physical button on the speaker or by interaction on a user interface available on a remote computing device configured to be operationally connected to the sound projection device 1.

As shown in FIG. 1, a total of forty-eight (48) parametric speakers are used. This one particular embodiment is shown to project sound to a recipient within twelve (12) feet away. A person standing behind the sound projection device also can only hear the sound being projected forward very faintly. This embodiment therefore may provide the advantage that drivers in particular look for: the ability to project sound to a child in the back seat while the driver in the front seat is not bothered by the sound.

A parametric speaker typically may include a transducer array and a driver circuit, with the driver circuit taking a 20-40 kHz carrier input. An audio source, which may be a computing device, a DVD player, a CD player, or other audio sources, may output audio signal, which then modulates the carrier input in the driver circuit. The driver circuit may include an amplifier to amplify the carrier input modulated by the audio signal, even though the audio signal may also be separately amplified depending on the source.

The number of parametric speaker present within a sound projection device may vary and be more or less than forty-eight (48). It is contemplated that arrangement of two (2) to thousands of speakers within a sound projection device may be present. As shown herein, all parametric speakers are arranged in close physical proximity with each other and in only one cluster. It is contemplated that the parametric speakers may be arranged in different clusters within one sound projection device, and the clusters may be separated physically from each other while contained within the hollow body of the sound projection device 1.

The parametric speakers 14 may be arranged on and physically attached to a solid base 12. The solid base 12 may provide a place to arrange the parametric speakers 14 on the same plane and also provides the mechanical stability needed to ensure the parametric speakers 14 do not move in location during operation. Once attached to the solid base 12, the parametric speakers 14 may have wires organized on the back of the solid base 12 and fit within the space between the solid base 12 and the back of the hollow body of the sound projection device 1. Parametric speakers 14 in the sound projection device 1 according to embodiments may be wired parallelly. Parallel wiring may decrease overall resistance of the circuit. Adding additional speakers is also easier in parallel wiring and the number of parametric speakers may be modified easily.

Wires may connect the parametric speakers 14 to the wireless communication means (not shown in the drawings) and the power source (also not shown in the drawings), as well as connect the parametric speakers to each other. Wires transmit power and signals to operationally connect the parametric speakers to various components within the sound projection device 1.

In embodiments, the sound projection device 1 may be configured to wirelessly communicate with a remote computing device via a wireless communication means. The wireless communication means may be a Bluetooth module with a Bluetooth antenna capable of wireless communication with a remote computing device serving as a sound generating source, such as a smart phone, a tablet, a laptop, a desktop, or a computing device integrated into another electronic device. Alternatively, the parametric speakers may be connected to another sound generating device, such as a DVD or CD player.

Each of the speakers is similar to each other and they may be wired parallelly and may be configured such that all of them can be turned on/off together. A power source may be provided within the sound projection device 1 to provide power for the operation of the sound projection device 1, such as a one-time use battery or rechargeable battery. A battery, such as a rechargeable lithium-ion battery or batteries may be embedded within the sound projection device 1 to provide power for operation of the sound projection device 1. Where a rechargeable battery is provided, the sound projection device 1 may be provided with a battery charging port capable of receiving a power cord. Rechargeable batteries may also be removable for charging at a station. Alternatively, one-time, non-rechargeable batteries may be provided, and dead batteries may be discarded and replaced with new batteries. Another way to provide power to the sound projection device 1 is to equip it to receive electrical power by a wire plugged into an available power point, such as a power point on a building wall.

The sound projection device 1 may be operatively connected to a sound generating device, such as a DVD player, a CD player, a computing device such as a smart phone, a tablet, a laptop computer, a desktop computer, or other computing devices detached from the sound projection device 1. The connection may be by wireless means, such as by a Bluetooth module connection. Connection by wires is contemplated.

The sound projection device 1 may comprise an on/off switch 10, which may be a physical switch. The switch 10 may operate to turn the sound projection device 1 on or off. Alternatively, the sound projection device 1 may be activated remotely by sending a wireless signal from a remote computing device. The volume of the parametric speakers may be adjusted using a dial on the sound projection device and/or an adjustment mechanism on the sound generation device, such as a smart phone, a table, a computer, a DVD player, or a CD player. A computer programming product may be provided on a remote computing device for purpose of controlling and operating the sound projection device 1 according to embodiments, such as an application on a mobile computing device or a software on a desktop or laptop.

The speakers used herein are parametric speakers projecting high frequency sound. Parametric speakers may project sound to a small range, such that a person standing a few feet away from the targeted person may not hear the sound that the targeted person receives. Use of parametric speakers in this manner ensures that only the targeted person, in this case, the child, receives the sound and not anyone else. Adults driving cars, pushing strollers or simply babysitting the child may use this sound projection device to deliver sounds to the child while not having to hear the same sound.

Figure 2:
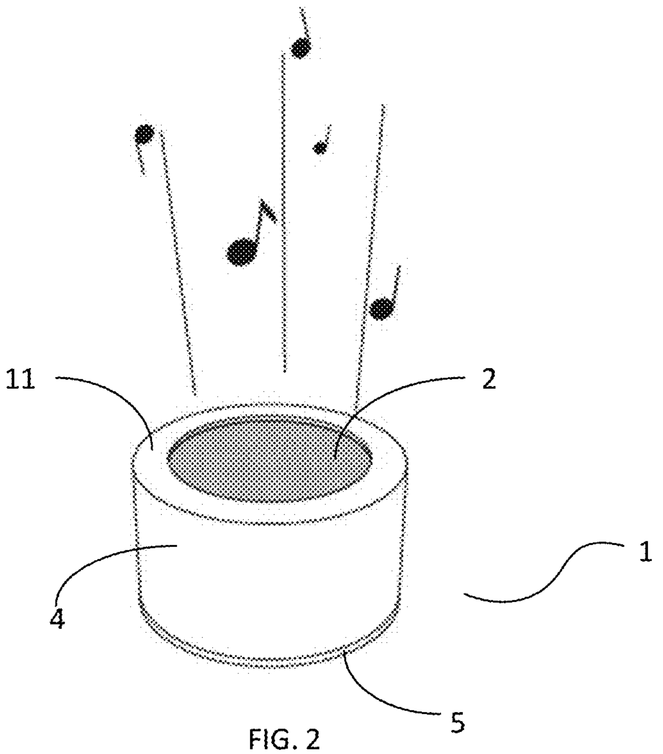
FIG. 2 illustrates an embodiment of the sound projection device without a sound directing panel.

FIG. 2 illustrates an embodiment of the sound projection device 1. The sound projection device 1 as illustrated herein may comprise a body 4 wherein a plurality of parametric speakers are arranged in a cluster to achieve sound projection to only one person. The body 4 as shown herein is generally of a round, tubular shape, however other shapes capable of housing a plurality of speakers are contemplated. A possible shape for the sound projection device 1 may be a substantially rectangular hollow body with a thickness. On one side of the body may be a cover 2, which may be a swath of material to cover the front 11 but allows for sound projection via small apertures, such that the swath of material in this case is similar to a mesh. The cover 2 may be made of fabric or a metal mesh. Other materials capable of allowing uniform sound projection through it may be used.

For a sound projection device 1 as in FIG. 2, sounds emitted may be projected in a “fan like” manner, such that the sounds may spread out like a fan and not in a focus beam, which is more desirable in this application. The nature of parametric speakers inside the sound projection device may provide a focused projection pathway of sound and in this embodiment, there is only a small amount of “fanning”, i.e., the sounds emitted are in a focus beam with a small amount of spread from the source. However, it is imperative that sounds emitted from the sound projection device be focused in a small area to ensure receipt by one person and not others nearby.

Figure 3:
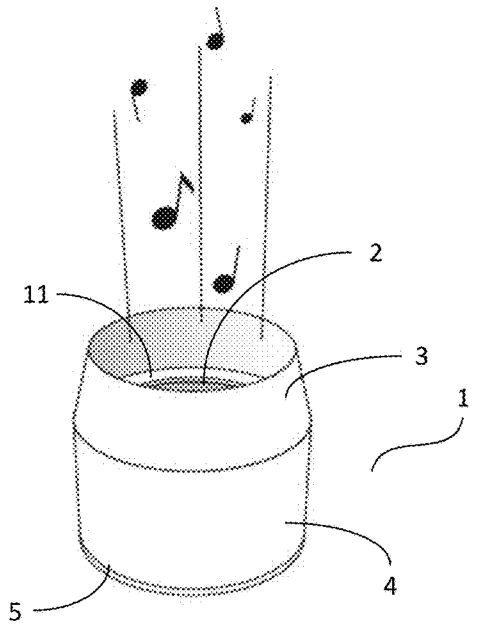
FIG. 3 illustrates another embodiment of the sound projection device with a sound directing panel in the shape of a cone.

In embodiments, outside the cover 2 may be a sound directing panel 3 to assist with sound projection, especially in orienting sound direction. The panel 3 as in FIG. 3 is shaped generally like a cone, with two sides of the cone having different diameters, the side with the larger diameter is attached to the front 11 while the side with the smaller diameter is directed away from the front 11. This may allow the sounds to be more focused as it moves from the cover 2 to the outside environment.

Figure 4:
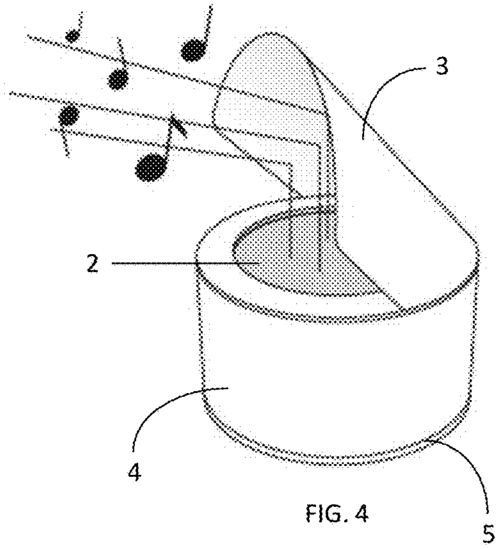
FIG. 4 illustrates another embodiment of the sound projection device with a sound directing panel in the shape of a roof.

Apart from focusing the sound beam, a sound directing panel may serve to direct the sounds to a different direction. FIG. 4 illustrates another embodiment of the sound projection device 1. The sound projection device 1 shown herein is similar to the device in FIG. 2 and FIG. 3, but with a different sound directing panel 3. In this embodiment, the sound directing panel 3 may be shaped like the visor of a baseball hat. As illustrated in FIG. 3, the panel 3 may be attached to the front side at an angle, as shown herein, forty-five degree (45°). This sound directing panel 3 may orient sound projection in a different manner, such that sound emitting from the sound projection device 1 is directed in a direction dictated by the panel 3. In FIG. 4, the sounds emitted from the sound projection device 1 may be projected in a direction that is at a right angle to the original direction of the sounds. The sound directing panel 3 as in FIG. 4 may be attached to the sound projection device 1 at an angle other than 45°. Other sound directing panels with different structures and shapes are contemplated.

Sound directing panels 3 may be made from metal alloys, metals, or other suitable materials. Choice of panel shape and size may be predetermined to orient sound in different manners. The sound projection device 1 may also be provided with various sound directing panels in various shapes and sizes capable of being attached and detached to the sound projection device 1. The user may choose from different sound directing panels to attached to the sound projection device 1 to direct sounds in different directions and manners.

Figure 5:
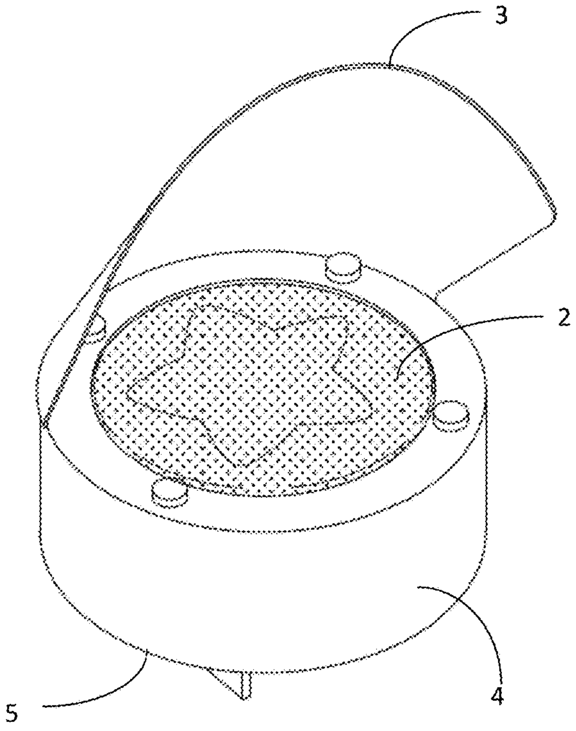
FIG. 5 is another perspective of the same sound projection device as in FIG. 4.
Figure 6:
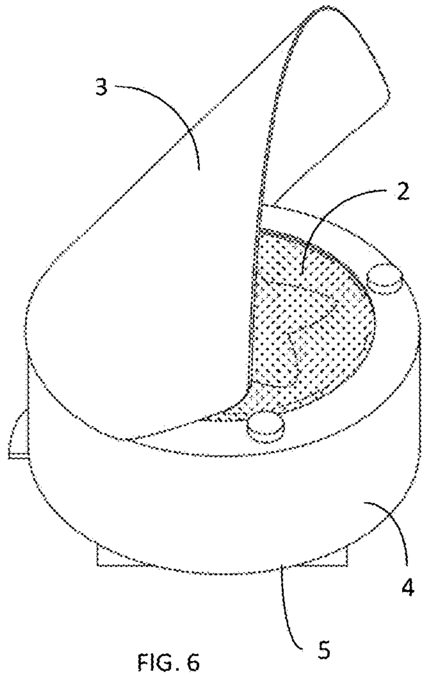
FIG. 6 is yet another perspective of the same sound projection device as in FIG. 4.

FIGS. 5 and 6 illustrate different perspective views of the same sound projection device as in FIG. 4. In FIGS. 5 and 6, the sound directing panel 3 may be attached to the sound projection device 1 such that there is no gap between the sound directing panel 3 and the front 11 of the body. This may be achieved by providing the sound directing panel 3 with a ring compatible to the dimension of the front. The ring carrying the sound directing panel 3 may be attached to the front 11 by an attachment mechanism, which may include mechanical screws, by molding or by welding. Other removable attachment means, such as by glue, snap-in, or by fastening mechanisms may be made available.

On the other side of the body 4 is a back side 5. The back side 5 may be configured to cover the back of the body and provide mechanical stability to the sound projection device 1. The back side 5 may also be configured to mechanically attach to a mounting pad 6, which in turn may be attached to other holders, such as a clip, a handle, or a strap. Attachment to the mounting pad 6 may enable the sound projection device 1 to be attached to various structures and used in various settings. Where the sound projection device 1 is used to deliver sound to infants and toddlers, the attachment mechanism may enable the sound projection device 1 to be used with a crib, a child seat, a stroller, a child car seat, etc.

The sound projection device may be removable and used in different settings. For a young child, the demand for sound delivery may be at different locations, such as in a baby stroller, in a car, in a crib, or while being held by an adult. Therefore, the sound projection device may be in sizes suitable for use in these various locations. The sound projection device may also be removeable and can be attached to furniture, machines, vehicles, etc. Various attachment and/or mounting mechanisms may be provided with the sound projection device to satisfy this demand.

Figure 7:
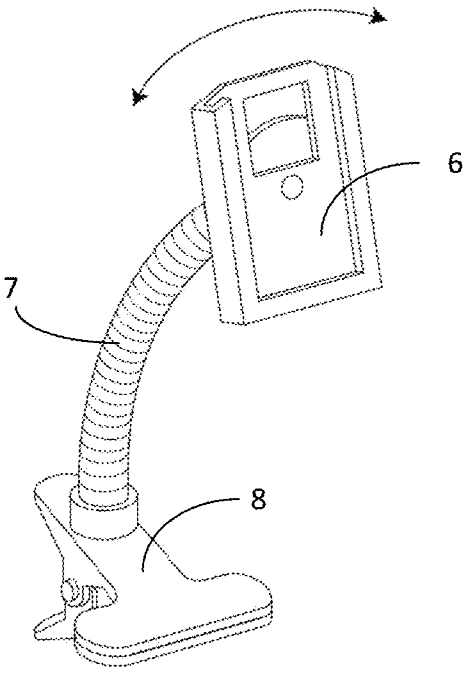
FIG. 7 illustrates a flexible mounting pad attached to an adjustable handle and a clip.

FIG. 7 illustrates a handle with a mounting pad to be used with the sound projection device according to embodiments. The mounting pad 6 may be at one end of a handle 7 and may be configured to physically attach to the back side 5 of the sound projection device 1. The mounting pad 6 may be able to swivel around the attachment point with the handle 7. The attachment mechanism as shown in FIG. 7 is "sliding" attachment, where the parts slide against each other and attached by "snapping" together. Other attachment mechanisms are contemplated, such as by Velcro, gel, screw, etc.

The mounting pad 6 may be attached to a handle 7, which may be flexible and may be twisted at any angle to provide better placement of the sound projection device 1. Optionally, the handle 7 may be extendable in length to accommodate any movement need. The mounting pad 6 may be permanently attached to the handle 7 or may be removable from the handle 7 for ease of storage. At the bottom of the handle 7 may be a clip 8, which may be used to attach the handle 7 to any suitable object. The clip 8 may be exchanged for another clip of a different size. With the clip 8 and handle 7, the sound projection device 1 may be attached to baby strollers, cribs, baby's car seats, or driver's car seats, etc.

Figure 8:
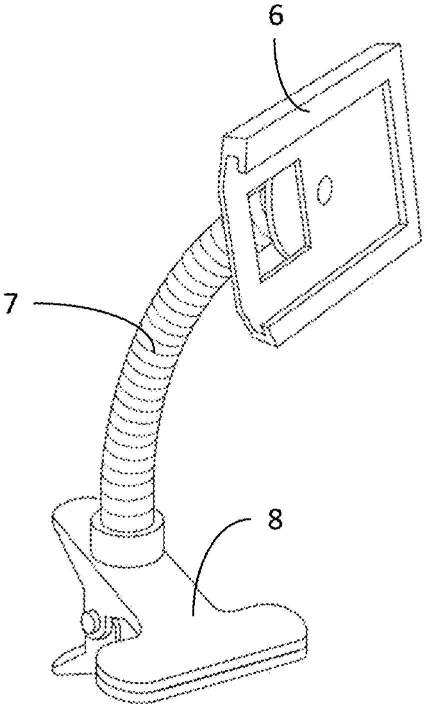
FIG. 8 is another view of the same mounting pad attached to an adjustable handle and a clip as in FIG. 7, with the mounting pad tilted in a different direction.

FIG. 8 illustrates the same handle with a mounting pad and clip as in FIG. 7, with the mounting pad 6 shown in a different orientation than in FIG. 7. This illustrates the mounting pad's ability to swivel. This may allow another level of placement adjustment for the sound direction device during use.

Figure 9:
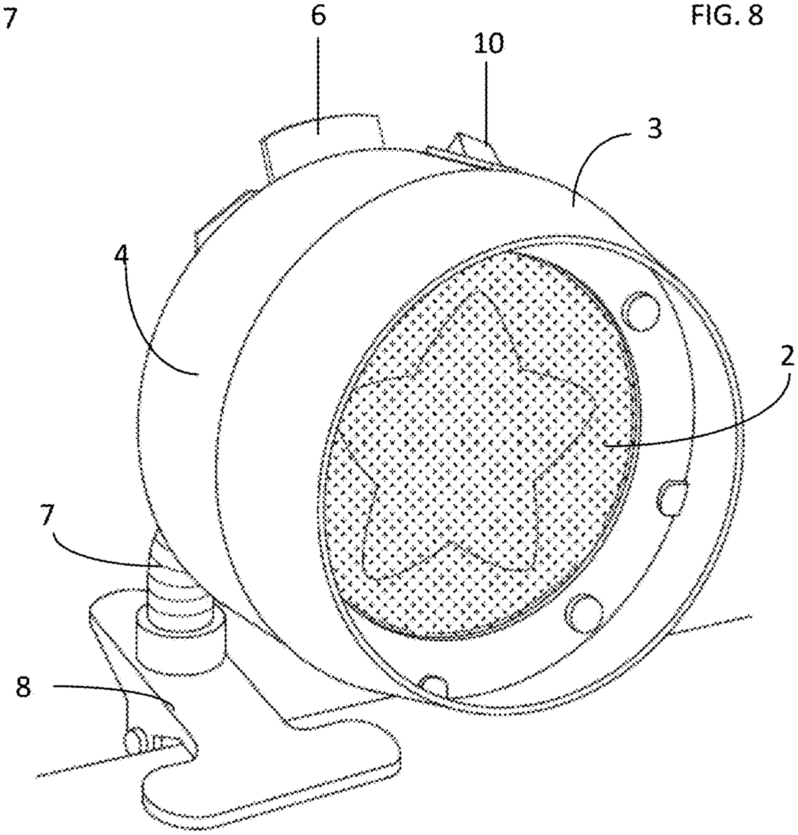
FIG. 9 illustrates a sound projection device according to embodiments attached to a flexible mounting pad attached to an adjustable handle and a clip, and the clip is attached to a surface.

FIG. 9 illustrates an embodiment of the sound projection device 1 attached to a handle 7 and clip 8 via a mounting pad 6. The sound projection device 1 shown here has a cone-shape sound directing panel 3 attached to it. The clip 8 may attached to any beam, handle, or surface capable of being clipped to. The clip 8 and handle 7 may position the sound projection device 1 at a fixed location and thereby ensuring that sounds emitted from the sound projection device 1 are received at the desired location.

Figure 10:
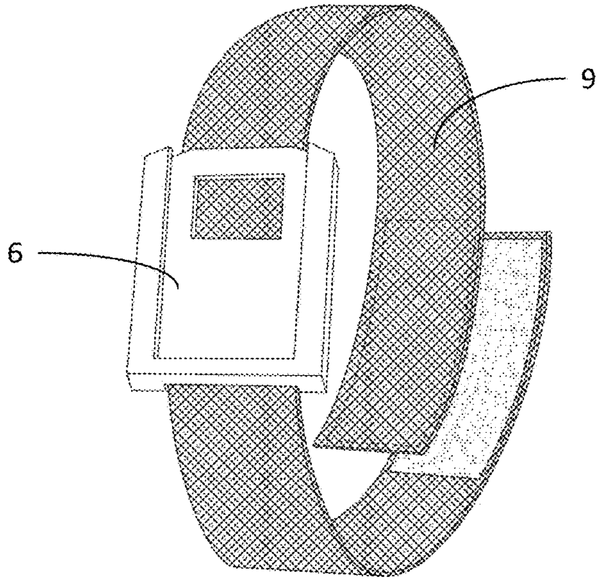
FIG. 10 illustrates a mounting pad attached to a strap.

FIG. 10 illustrates another mounting mechanism for the sound projection device 1. A strap 9 may be used to attach the mounting pad 6 and consequently the sound projection device 1 to another object. A strap 9 may be more suitable for attachment in certain settings, such as attachment to a car seat. However, a strap may be used at any location that is suitable. As illustrated herein, the mounting pad 6 may be moved along the strap 9 for better placement, and the strap 9 may be adjusted in length. The strap 9 may be secured by Velcro, like in FIG. 10, however it may also be secured by a knot, sticky tape, stapling, eyelets, or other mechanisms. Straps 9 may be made of flexible and pliable materials such as fabrics, cotton, leather, plastic, a combination thereof, or other suitable materials.

Figure 11:
FIG. 11 illustrates a sound projection device with a clip attached to a baby crib.

FIG. 11 illustrates a use of the sound projection device 1. In this case, the sound projection device 1, using a handle 7 and a clip 8, may be attached to a crib. The handle 7 may be adjusted to position the sound projection device 1 such that sounds emitted be received by the baby rested in the crib. The mounting pad 6 may also be used to adjust the sound projection device's 1 position as needed.

Figure 12:
FIG. 12 illustrates a sound projection device with a clip attached to a baby stroller.

FIG. 12 illustrates another use of the sound projection device 1. The sound projection device 1 shown herein is also attached to a handle 7 and a clip 8, with the handle 7 being adjusted and bent down to project sounds in a direction determined by a user. The sound projection device 1 may be attached by the clip 8 to the handle of the baby strollers and oriented by changing the direction of the handle 7 and/or the mounting pad 6, such that sounds emitted from the sound projection device 1 may be directed at the baby inside the stroller.

Figure 13:
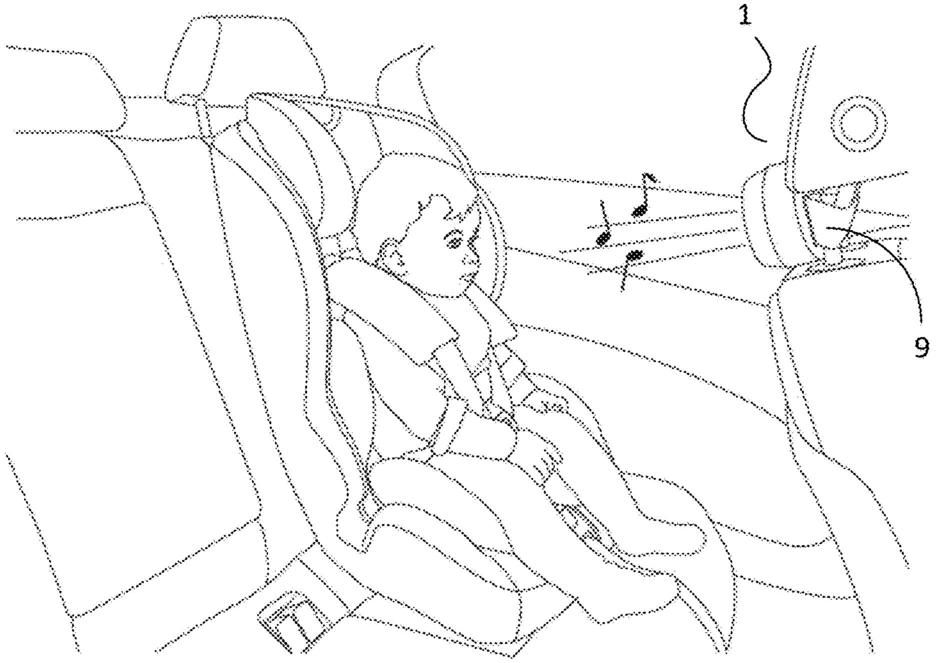
FIG. 13 illustrates a sound projection device with a strap attached to the back of a car driver's seat.

FIG. 13 illustrates yet another use of the sound projection device 1. The sound projection device 1 as in FIG. 13 is attached to a mounting pad 6 attached to a strap 9. The strap 9 may be attached to the back of a car seat, such that sounds emitted from the sound projective device 1 are directed at a child sitting in a child car seat located at the back of the car.

In embodiments, the sound projection device may be used to project sounds to young children for many purposes. The parametric speakers may deliver sounds in a directed manner such that only the targeted recipient, in this case the child, receives the sounds. Content of the sound may be sounds for meditation, such as relaxing sounds, guided meditation for children with language comprehension, lullabies, songs, nursery rhymes, or other sounds aimed at entertaining children.

The sound projection device may be configured to communicate with a remote computing device that plays the role of a sound generating source. The remote computing device may be a smart phone, a tablet, a desktop, a laptop, or a computer embedded into another electronic device such as a refrigerator. The remote computing device may be configured to wirelessly communicate with and operate the sound projection device via a computer programming product, such as an application or a software. For an example, in an embodiment, a mobile phone may be configured with an application to communicate with the sound projection device. The mobile phone may be embedded with soundtracks in the nature of meditation sounds, music, songs, lullabies, nursery rhymes, or other sounds. Using the application, a user can choose at least one soundtrack to play. The sounds thereafter are emitted from the sound projection device and projected to the child while not being heard by others nearby. The application may be configured such that the user may adjust volume, play soundtracks continuously, or stop playing the soundtracks after a certain amount of time, among other operating options.

Similar operational connections may be configured between the sound projection device and other computing devices, such that a user may use a tablet, a laptop, a desktop or other computing devices to turn on the soundtracks, adjust the volume and play the soundtracks to the child, who receives sounds from the sound projection device. A DVD or CD player may also be configured to operate in similar manners, even though control of volume and soundtrack choices may be more limited. Where the sound projection device has a volume adjustment mechanism on its body, the volume may also be adjusted that way.

Parts may be assembled by hand and/or by automated means. Parts that are connected to each other are done so using any combination of mechanical fastening techniques (e.g., screws, pins, etc.) or by molding and/or soldering.

While the present invention has been discussed in detail with reference to certain embodiments, other embodiments are possible. Therefore, the scope of the appended claims should not be limited to the description of the preferred embodiments contained in this disclosure.

All references, including publications, patent applications, and patents cited herein are hereby incorporated by reference to the same extent as if each reference were individually and specifically indicated to be incorporated by reference and were set forth in its entirety herein.

It will be readily apparent to those skilled in the art that a number of modifications and changes may be made without departing from the spirit and the scope of the present invention. It is to be understood that any ranges, ratios, and range of ratios that can be derived from any of the data disclosed herein represent further embodiments of the present disclosure and are included as part of the disclosure as though they were explicitly set forth. This includes ranges that can be formed that do or do not include a finite upper and/or lower boundary. Accordingly, a person of ordinary skill in the art will appreciate that such values are unambiguously derivative from the data presented herein

What is claimed is:

1. A sound projection device, comprising:

a hollow body with a thickness, a front and a back, the hollow body configured to contain multiple components;

a plurality of parametric speakers arranged with the hollow body and completely contained within the hollow body;

a wireless communication means configured to communicate with at least one remote computing device and to operatively connect to the plurality of parametric speakers, the wireless communication means is configured to receive signals from the remote computing device and operate the plurality of parametric speakers;

a power source;

multiple wires configured to physically and operatively connect the plurality of parametric speakers to each other, to the wireless communication means, and to the power source;

a sound directing panel attached to the front cover:

a front cover attached to the front of the body; and a back cover attached to the back of the body;

wherein the parametric speakers are wired parallelly, wherein the plurality of parametric speakers are arranged in a cluster close to each other, the parametric speakers are without sound directive covers and are not surrounded, wherein the plurality of parametric speakers are operatively connected to each other and not to any other portions and wherein the sound projected from the sound projection device can be heard by a person positioned at 12 inches from the sound projection device.

2. The sound projection device of claim 1, wherein the hollow body is in substantially tubular shape.

3. The sound projection device of claim 1, wherein the hollow body is in substantially rectangular shape.

4. The sound projection device of claim 1, further comprising an on/off switch.

5. The sound projection device of claim 1, wherein the sound directing panel is in the shape of a baseball visor attached to the front cover at an angle.

6. The sound projection device of claim 5, wherein the angle is 45°.

7. The sound projection device of claim 1, wherein the back is configured to be attachable to a mounting pad.

8. The sound projection device of claim 7, further comprising a mounting pad configured to be attachable to the back of the body.

9. The sound projection device of claim 8, further comprising a detachable, flexible handle attached to the mounting pad.

10. The sound projection device of claim 9, wherein the detachable, flexible handle is adjustable in length.

11. The sound projection device of claim 9, further comprising a detachable clip attached to the detachable, flexible handle.

12. The sound projection device of claim 8, further comprising a strap attachable to the mounting pad.

13. The sound projection device of claim 12, wherein the strap has a Velcro attachment mechanism on the strap's body.

14. The sound projection device of claim 12, wherein the strap has eyelets to change the length in use.

15. The sound projection device of claim 8, further comprising a volume adjustment button.

16. The sound projection device of claim 8, further comprising a remote computing device configured to operatively connect to the sound projection device via a wireless communication means.

17. The sound projection device of claim 16, wherein the remote computing device is a smart phone, a tablet, a laptop, or a desktop computer.

18. A method to provide sounds to a child, the method comprising:

providing a sound projection device as in claim 16;

orienting the sound projection device towards the child;

activating the sound projection device using the remote computing device; and playing sounds from the remote computing device.

* * * * *